US011391873B2

(12) United States Patent
Mochizuki et al.

(10) Patent No.: US 11,391,873 B2
(45) Date of Patent: Jul. 19, 2022

(54) DYE-BASED POLARIZING PLATE FOR INFRARED WAVELENGTH RANGE USING AZO, ANTHRAQUINONE, OR CYANINE COMPOUND

(71) Applicants: Nippon Kayaku Kabushiki Kaisha, Tokyo (JP); Polatechno Co., Ltd., Joetsu (JP)

(72) Inventors: Noriaki Mochizuki, Tokyo (JP); Takahiro Higeta, Tokyo (JP)

(73) Assignees: Nippon Kayaku Kabushiki Kaisha, Tokyo (JP); Polatechno Co., Ltd., Niigata (JP)

( * ) Notice: Subject to any disclaimer, the term of this patent is extended or adjusted under 35 U.S.C. 154(b) by 323 days.

(21) Appl. No.: 16/348,253

(22) PCT Filed: Nov. 13, 2017

(86) PCT No.: PCT/JP2017/040789
§ 371 (c)(1),
(2) Date: May 8, 2019

(87) PCT Pub. No.: WO2018/088558
PCT Pub. Date: May 17, 2018

(65) Prior Publication Data
US 2019/0271801 A1 Sep. 5, 2019

(30) Foreign Application Priority Data

Nov. 14, 2016 (JP) .............................. JP2016-221165

(51) Int. Cl.
G02B 5/30 (2006.01)
G02F 1/1335 (2006.01)
C09B 5/24 (2006.01)
C09B 23/04 (2006.01)
C09B 35/56 (2006.01)
C09B 23/00 (2006.01)

(52) U.S. Cl.
CPC .............. G02B 5/30 (2013.01); C09B 5/24 (2013.01); C09B 23/00 (2013.01); C09B 23/04 (2013.01); C09B 35/56 (2013.01); G02F 1/1335 (2013.01)

(58) Field of Classification Search
CPC .... G02B 5/30–3091; G02B 27/28–288; G02F 1/133528; G02F 1/133533; G02F 1/133536; G02F 2001/133531; G02F 2001/133538; G02F 2001/133541; G02F 2001/133543; G02F 2001/133545; G02F 2001/133548; G02F 2001/13355 1/13362

See application file for complete search history.

(56) References Cited

U.S. PATENT DOCUMENTS

| 2,494,686 | A | | 1/1950 | Blake |
| 3,046,839 | A | * | 7/1962 | Bird ...................... G02B 5/3058 427/163.1 |
| 3,978,428 | A | | 8/1976 | Burnham et al. |
| 6,563,640 | B1 | * | 5/2003 | Ignatov ................ G02B 5/3016 349/194 |
| 10,280,181 | B2 | * | 5/2019 | Katoh .................. C09K 19/601 |
| 2003/0232153 | A1 | | 12/2003 | Nazarov et al. |
| 2006/0182902 | A1 | | 8/2006 | Yoneyama et al. |
| 2007/0258141 | A1 | * | 11/2007 | Ohgaru .................... G02B 1/11 359/487.02 |
| 2009/0174942 | A1 | | 7/2009 | Sadamitsu et al. |
| 2010/0182538 | A1 | | 7/2010 | Takata |
| 2011/0013122 | A1 | | 1/2011 | Kim et al. |
| 2014/0299020 | A1 | | 10/2014 | Shimizu et al. |
| 2016/0054496 | A1 | | 2/2016 | Ichihashi et al. |
| 2017/0227693 | A1 | | 8/2017 | Ito et al. |

FOREIGN PATENT DOCUMENTS

| CN | 1324452 A | 11/2001 |
| CN | 1867637 A | 11/2006 |
| CN | 101466798 A | 6/2009 |
| CN | 101512420 A | 8/2009 |
| CN | 105190382 A | 12/2015 |
| DE | 112014002328 T5 | 1/2016 |
| EP | 1128192 A1 | 8/2001 |
| JP | 59-11385 A | 1/1984 |
| JP | 59-25293 A | 2/1984 |
| JP | 59-26293 A | 2/1984 |
| JP | 61-221264 A | 10/1986 |
| JP | 63-33477 A | 2/1988 |
| JP | 6-16616 A | 1/1994 |
| JP | 7-72332 A | 3/1995 |
| JP | 2001-181184 A | 7/2001 |

(Continued)

OTHER PUBLICATIONS

European communication dated Jun. 9, 2020 in corresponding European patent application No. 17868832.1.

(Continued)

Primary Examiner — Ryan S Dunning
(74) Attorney, Agent, or Firm — Nields, Lemack & Frame, LLC

(57) ABSTRACT

The purpose of the present invention is to provide: a high-performance polarizing plate which functions for light in an infrared wavelength range; and a liquid-crystal display device or the like comprising the same.

Provided is a polarizing plate for an infrared range, which is a stretched film containing a dye exhibiting absorption in an infrared range, the film exhibiting dichroism.

11 Claims, No Drawings

(56) References Cited

FOREIGN PATENT DOCUMENTS

| JP | 2001-249227 A | 9/2001 |
|---|---|---|
| JP | 2002-528758 A | 9/2002 |
| JP | 2004-86100 A | 3/2004 |
| JP | 2006-508034 A | 3/2006 |
| JP | 2008-209574 A | 9/2008 |
| JP | 2009-104062 A | 5/2009 |
| JP | 2010-106248 A | 5/2010 |
| JP | 2013-24982 A | 2/2013 |
| JP | 2013-64798 A | 4/2013 |
| JP | 2013-195504 A | 9/2013 |
| JP | 2014-219552 A | 11/2014 |
| JP | 2015-45710 A | 3/2015 |
| JP | 2016-90715 A | 5/2016 |
| JP | 2016-148871 A | 8/2016 |
| JP | 5979728 B | 8/2016 |
| WO | 2015/087709 A1 | 6/2015 |
| WO | 2016/171218 A1 | 10/2016 |

OTHER PUBLICATIONS

Taiwanese communication, with English translation, dated Nov. 9, 2020 in corresponding Taiwanese patent application No. 106139317.
International Search Report and Written Opinion dated Feb. 6, 2018 in corresponding PCT application No. PCT/JP2017/040789.
Chinese communication, with English translation, dated Jun. 29, 2021 in corresponding Chinese patent application No. 201780066074.7.
Shan'Din et al., "Liquid Crystal and Display Application", East China Institute of Chemical Technology Publisher, Jan. 1993, p. 182.
Chinese communication, with English translation, dated Nov. 26, 2021 in corresponding Chinese patent application No. 201780066074.7.

* cited by examiner

DYE-BASED POLARIZING PLATE FOR INFRARED WAVELENGTH RANGE USING AZO, ANTHRAQUINONE, OR CYANINE COMPOUND

TECHNICAL FIELD

The present invention relates to a dye-based polarizing plate for an infrared wavelength range.

BACKGROUND ART

Polarizing plates, which have the capability of transmitting or blocking light, are used in display devices such as liquid-crystal displays (LCDs), where they act in conjunction with liquid crystal, which has an optical switching function. As well as their earlier use in small devices such as calculators and watches, LCDs have found their way into such applications as laptop computers, word processors, liquid-crystal projectors, liquid-crystal televisions, car navigation system, indoor and outdoor information display devices, and measuring instruments. Polarizing plates can also be formed into lenses having a polarizing function, and as such are used in, for example, sunglasses providing improved visibility and, more recently, polarizing glasses for 3D televisions.

Typical polarizing plates are produced by dyeing with iodine or a dichroic dye, or adding it to, a stretched and oriented film of polyvinyl alcohol or a derivative thereof, or an oriented film of a polyene formed by dehydrochlorination of a polyvinyl chloride film or by dehydration of a polyvinyl alcohol film. Of them, iodine-based polarizing plates, produced using iodine, have excellent polarizing performance, whereas dye-based polarizing plates, produced using a dichroic dye, are more resistant to moisture and heat. All such commonly used polarizing plates are for a visible wavelength range, not an infrared wavelength range.

In recent years, polarizing plates for not only the visible wavelength range but also for the infrared wavelength range have become necessary in applications such as recognition light sources for touchscreens, security cameras, sensors, anticounterfeiting applications, and communication devices. Polarizing plates for an infrared wavelength range are used for, for example, optical waveguides; optical switching, and anti-reflection means for such light in applying the function of liquid crystal for light in the infrared range. In response to these and other demands, there are reports of an infrared polarizing plate for an infrared range produced from an iodine-based polarizing plate produced by polyene conversion, as disclosed in Patent Document 1; an infrared polarizing plate using a wire grid, as disclosed in Patent Documents 2 and 3; an infrared polarizing element produced by stretching glass containing fine particles, as disclosed in Patent Document 4; and a polarizing element using cholesteric liquid crystal, as disclosed in Patent Documents 5 and 6. The technique described in Patent Document 1 has not been put into practical use because of low durability, specifically, low thermal resistance, low hygrothermal durability and low photo resistance. The wire-grid polarizing plates of Patent Documents 2 and 3 are widespread since they can also be processed in the form of a film and are stable as products. However, because nano-scale irregularities on the surface are essential for maintaining their optical properties, the surface must not be touched, which limits applications and makes anti-reflection processing and anti-glare processing difficult. Furthermore, since nano-scale processing is required, the manufacture of polarizing plates having a large area is difficult and thus the products are very expensive. The stretched-glass polarizing plates containing fine particles disclosed in Patent Document 4 are highly durable and dichroic, and have therefore been put to practical use, and this type is expected to see future development. However, since glass is stretched with fine particles included therein, the element itself is fragile and is easily broken although it is a glass plate. Furthermore, the problem is that surface processing and bonding with other substrates are difficult since the plate is not as flexible as a conventional polarizing plate. Although the techniques disclosed in Patent Document 5 and Patent Document 6 involve circular polarization, which has long been known, the color of the polarizing plate varies depending on the angle from which the plate is viewed. Also, since the plate is based on the use of reflection, stray light occurs and thus absolutely polarized light is difficult to produce. In short, there are no polarizing plates for an infrared wavelength range which are absorption type such as generic iodine- and dye-based polarizing plates and which are in the form of a flexible, highly durable film.

PRIOR ART DOCUMENTS

Patent Documents

Patent Document 1: U.S. Pat. No. 2,494,686
Patent Document 2: JP 2016-148871 A
Patent Document 3: JP 2013-24982 A
Patent Document 4: JP 2004-86100 A
Patent Document 5: International Publication No. WO2015/087709
Patent Document 6: JP 2013-64798 A
Patent Document 7: JP S59-25293 A

SUMMARY OF INVENTION

Problem to be Solved by the Invention

An object of the present invention is to provide a high-performance polarizing plate which functions for light in an infrared wavelength range and a liquid-crystal display device or the like comprising the same.

Means to Solve the Problem

To achieve the above object, the present inventors have conducted intensive research and, as a result, have discovered that a stretched film containing a dye exhibiting absorption in an infrared range functions as a polarizing plate for infrared wavelength light.

Specifically, the present invention relates to the following (1) to (13):

(1) A polarizing plate which is a stretched film comprising a dye exhibiting absorption in an infrared range and which is dichroic in an infrared range.

(2) The polarizing plate according to (1), wherein the dye exhibits a maximum absorption at a wavelength of 700 to 1,500 nm.

(3) The polarizing plate according to (1) or (2), wherein the due is selected from the group consisting of an azo compound, an anthraquinone compound, and a cyanine compound.

(4) The polarizing plate according to any one of (1) to (3), wherein the dye is a water-soluble dye.

(5) The polarizing plate according to any one of (1) to (4), wherein the film comprises a hydrophilic polymer as a base material.

(6) The polarizing plate according to (5), wherein the hydrophilic polymer is a polyvinyl alcohol resin.

(7) The polarizing plate according to any one of (1) to (6), further comprising a transparent protective layer on one or both sides.

(8) A liquid-crystal display device, a sensor, a lens, a switching device, an isolator or a camera, comprising the polarizing plate according to any one of (1) to (7).

(9) A method of using a dye exhibiting absorption in an infrared range for a polarizing plate, the method comprising incorporating the dye in a film and stretching the film to develop dichroic properties.

(10) The method according to (9), wherein the dye exhibits a maximum absorption wavelength of 700 to 1,500 nm.

(11) The method according to (9) or (10), wherein the dye is selected form the group consisting of an azo compound, an anthraquinone compound, and a cyanine compound.

(12) The method according to any one of (9) to (11), wherein the dye is a water-soluble dye.

(13) The method according to any one of (9) to (12), wherein the polarizing plate is for a liquid-crystal display device, a sensor, a lens, a switching device, an isolator or a camera.

Advantageous Effects of Invention

The present invention can provide a high-performance polarizing plate which functions for light in an infrared wavelength range and a liquid-crystal display device or the like comprising the same. The polarizing plate of the present invention, which is for an infrared wavelength range, can be handled in the same manner as can a conventional polarizing plate, is flexible and chemically stable, does not produce stray light because it is an absorptive polarizing element, and has high weatherability (thermal resistance, hygrothermal resistance, and photo resistance).

DESCRIPTION OF EMBODIMENTS

In the present invention, a dye exhibiting absorption in an infrared range is oriented by stretching film so as to obtain anisotropic (i.e., so-called dichroic) absorption in an infrared range (which is also referred to as an infrared wavelength range or infrared light wavelength range). The term "infrared range", i.e., "infrared wavelength range" or "infrared light wavelength range", means a range from 700 to 30,000 nm. The polarizing plate a obtained in the present invention, which comprises a dichroic dye which absorbs light in an infrared range, functions as a polarizing plate for near infrared light. The wavelength of near infrared light means a wavelength from 700 to 1,500 nm. A polarizing plate for these wavelengths can be produced according to the present invention and used preferably for 700 to 1,100 nm, more preferably 750 to 1,000 nm. Such a polarizing plate may be used in sensors and the like provided it has a dichroic ratio which represents anisotropy of absorption, of five or greater, preferably 10 or greater, more preferably 20 or greater, more preferably still 30 or greater, and particularly preferably 100 or greater.

Two types of film containing a dichroic dye may be used in the present invention—one in which a hydrophilic polymer is used as the base material, and another in which a thermoplastic polymer is used. Although both types comprise incorporating a dichroic dye exhibiting absorption in an infrared range and orienting it, they differ in the methods used for processing them into polarizing plates First, the method of producing a polarizing plate for light in an infrared wavelength range will be described, the method comprising incorporating a dichroic dye exhibiting absorption in an infrared range into a hydrophilic polymer and orienting the dichroic dye.

The hydrophilic polymer is not particularly limited and refers to a film having high affinity with water, for example, refer to a film which absorbs water or swells when immersed in or contacted with water as a medium. Specifically, a polyvinyl alcohol resin, an amylose resin, a starch resin, a cellulose resin, a polyacrylate resin, a derivative thereof, and the like may be used. By incorporating a dichroic dye exhibiting absorption in an infrared light wavelength range into a film of such a resin and stretching the film, the dichroic dye is oriented and a polarizing plate is obtained. From the point of view of the incorporation and cross-linking of the dichroic dye, a film of a polyvinyl alcohol resin is the most preferable.

The abovementioned polarizing plate may be produced by a conventional method of producing a polarizing plate. In the case of, for example, a polarizing plate composed of a polyvinyl alcohol film containing a dye, first the polyvinyl alcohol film is allowed to swell in hot water or the like; an aqueous solution containing 0.01 to 10 parts by mass of a dye exhibiting absorption in an infrared range to 1,000 parts by mass of water is then prepared; and the film is immersed in the dyeing solution containing the dichroic dye to incorporate the dye into the hydrophilic polymer. The film is then longitudinally stretched to twice to eight times in a both containing a cross-linking agent such as boric acid or borax, and the resultant dried to yield a polarizing element. The performance of the polarizing plate may be adjusted by the dichroic properties of the dichroic dye or the stretching degree in the stretching step.

As an alternative way to the method comprising immersing a hydrophilic polymer in an aqueous solution containing a dichroic dye to incorporate the dye, as described above, the method in which a dye is previously included in a hydrophilic polymer and then the resulting polymer is stretched may be used. In this method, a polarizing plate can be obtained by processing a resin composition prepared by previously incorporating a dye into a hydrophilic polymer into a form of film and stretching the resulting film. In the method of incorporating a dye into a hydrophilic polymer, for example, to an aqueous solution in which 8 to 12% polyvinyl alcohol is dissolved in water; a dichroic dye is added in an amount of 0.01 to 10% based on the solid content of the aqueous solution; the resulting aqueous solution is formed into film by casting; and water solvent is evaporated to yield a film containing the dye; and the resulting film is stretched to obtain a polarizing plate.

To stretch the resulting film, a method involving stretching in warm water or a method involving stretching in an aqueous solution containing boric acid, this being the usual method of producing a polarizing plate by stretching, may be used. Alternatively, a dry stretching method may also be used. In dry stretching, the film, having been softened by heating, is stretched. In dry stretching, the film can be stretched in a heating medium for stretching such as air and a gas such as nitrogen. Although the stretch is preferably performed at a temperature in the range of room temperature to 200° C., the actual stretching temperature depends on the molding temperature of the resin. Also, the stretch is preferably performed in an atmosphere having a humidity of 10 to 95% RH. Examples of heating methods include roll-to-roll zone stretching, hot-roll stretching, press stretching, and infrared hot stretching. The stretching method is not limited as long as heat can be transferred to the film to effect stretching. The film is preferably stretched to twice to eight times. The stretching ratio may be adjusted in view of a ratio at which the resin can be stretched and a ratio for orienting the dye. The stretching may be performed in one or more stages.

Next, the method for producing a polarizing plate for light in an infrared wavelength range will be described, the method comprising incorporating a dichroic dye exhibiting absorption in an infrared range into a thermoplastic polymer and orienting the dichroic dye.

The thermoplastic polymer is not particularly limited and means a polymer which is plasticized (exhibits the properties of being softened) when heated. By processing it to a form of film, a thermoplastic polymer film is formed. A thermoplastic polymer having high transparency is preferred. Specific examples thereof include, but are not limited to, a polyester resin such as polyethylene terephthalate, nylon, polypropylene, polyethylene, polystyrene, polyvinyl chloride, or polycarbonate; and an acrylic resin such as PMMA. A dye is incorporated into a film of such a resin, and the film is stretched to obtain a dichroic polarizing plate.

A thermoplastic polymer with a dye previously included therein is processed to a form of film and the resulting film is stretched. In this method, a thermoplastic polymer is mixed with a dye; the mixture is kneaded, melted, and formed into a film; and the resulting film is stretched to yield a polarizing element. In another method, a thermoplastic resin composition is dissolved in a solvent; a dye is also dissolved in the solution; the resultant is formed into film by casting; the solvent is evaporated to yield the film; and the film is stretched to obtain a polarizing element. The method of making a polarizing plate using a thermoplastic polymer by previous dyeing is not particularly limited. For example, a dye is added in a thermoplastic resin in an amount of 0.01 to 5%, preferably 0.05% to 2%, and more preferably 0.1% to 1%, based on the resin; the resin mixture is melt-kneaded and melt-formed into film; and the resulting film is stretched to obtain a polarizing plate. In another method, for example, a thermoplastic resin is dissolved in a solvent; a dye is incorporated into the resin, the resin composition is formed into film by casting; the solvent is dried to yield a film; and the resulting film is stretched to obtain a polarizing plate.

To the resulting film, a wet stretching method (involving stretching in a solvent at high temperature), this being the usual method of producing a polarizing plate by stretching, may be used. To thermoplastic resins, it is normal to use a dry stretching method. In the dry stretching, the film, having been softened by heating, is stretched. In dry stretching, the film can be stretched in a heating medium for stretching such as air and a gas such as nitrogen. The stretch is preferably performed at a temperature in the range of room temperature to 180° C. Also, the stretch is preferably performed in an atmosphere having a humidity of 20 to 95% RH. Examples of heating methods include roll-to-roll zone stretching, hot-roll stretching, press stretching, and infrared hot stretching. The stretching method is not limited as long as heat can be transferred to effect stretching. The film is preferably stretched to twice to eight times. The stretching ratio may be adjusted in view of a ratio at which the resin can be stretched and a ratio for orienting the dye. The stretching may be performed in one or more stages.

Types of near-infrared-absorbing dyes according to the present invention include phthalocyanine types, naphthalocyanine types, metal complex types, boron complex types, cyanine types, squarylium types, diimonium types, diphenylamine/triphenylamine types, quinone types, and azo types. The absorption wavelength of such dyes is normally increased by extending the existing π conjugated system, and the dyes have a wide variety of absorption wavelengths depending on their structure. Furthermore, although most of them are hydrophobic or in the form of a pigment, they may be made water-soluble and used as hydrophilic dyes.

Such dyes may be in free form or in the form of salt. Examples of salts may be an alkali metal salt such as a lithium salt, a sodium salt or a potassium salt, or an organic salt such as an ammonium salt or an alkylamine salt. The salt is preferably a sodium salt.

Specific examples of dyes used in the present invention will be described below.

Phthalocyanine/naphthalocyanine dyes have a flat structure and a large π conjugated plane. They exhibit varied absorption depending on a metal center denoted by $M_1$ in General Formula 1. Examples of metal centers include Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb, and Bi. Examples of metal oxides include VO, GeO, and TiO. Examples of metal hydroxides include $Si(OH)_2$, $Cr(OH)_2$, $Sn(OH)_2$, and AlOH. Examples of metal halides include $SiCl_2$, VCl, $VCl_2$, VOCl, FeCl, GaCl, ZrCl, and AlCl. Of them, metal atoms such as Fe, Co, Cu, Ni, Zn, Al, and V, metal oxides such as VO, and metal hydroxides such as AlOH are preferred, and metal oxides such as VO are more preferred. Although these are normally used in the form of a pigment, a water-soluble group may be added to them, as described in General Formula 1 of JP H2-167791 A, to allow the dyes to be dissolved in water.

A preferable example of the dye represented by General Formula 1, below, wherein the dotted lines indicate aromatic rings that may or may not be present, is Compound Example 1, below, wherein p and k represent each independently an integer between 0 and 12; the sum of p and k represents between 0 and 12; and it is preferable that p be between 1 and 4, and k be 0.

(General Formula 1)

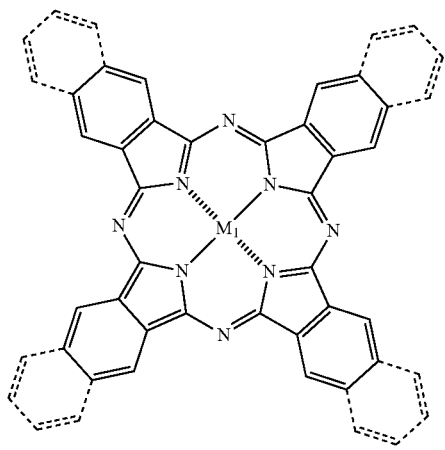

(Compound Example 1)

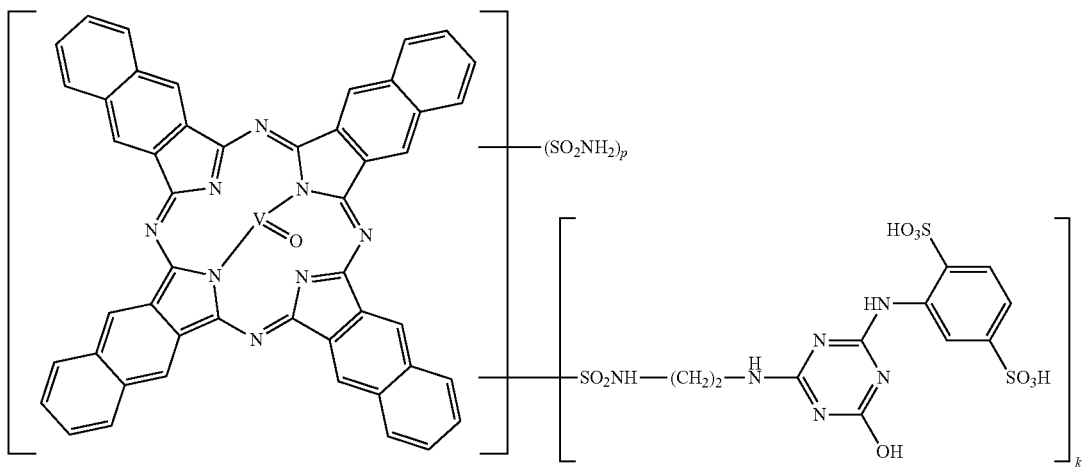

Quinone dyes, which exhibit wide absorption, are represented by General Formula 2, wherein $Ar_1$ and $Ar_2$ are each preferably a cyclic structure composed of an aromatic ring or a heterocyclic ring, the latter being more preferable for long-wavelength absorption. Examples of such dyes include anthraquinone dyes, as described in JP S61-221264 A. These rings may have a substituent, examples of which including an amino group which may have a substituent, a nitro group, a sulfo group, an alkyl group, an alkoxy group, an alkyl group having a sulfo group, and an alkyl group having a hydroxyl group. X is preferably an oxygen atom or a nitrogen atom. While many of them have a hydrophobic structure, some are known to become soluble in water if a water-soluble group is added. For example, indanthrone dyes are illustrated as disclosed in JP 2006-508034 A.

A preferable example of the dyes represented by General Formula 2 is one represented by Compound Example 2. In Compound Example 2, n is an integer between 1 and 12, and each sulfonic acid may be free form, a salt, or a mixture of both free form and salt at any ratio.

(General Formula 2)

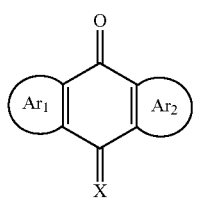

(Compound Example 2)

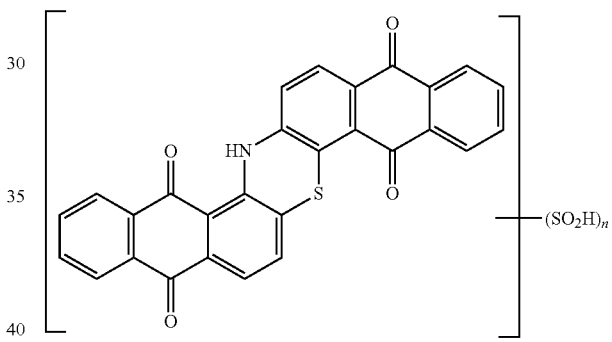

Cyanine dyes, which exhibit strong absorption in near-infrared range, are represented by General Formula 3 or General Formula 4, wherein $Ar_3$ to $Ar_6$ denote a heterocyclic ring, examples of which including a thiazole ring, a benzothiazole ring, a naphthothiazole ring, a thiazoline ring, an oxazole ring, a benzoxazole ring, a naphthoxazole ring, an oxazoline ring, a selenazole ring, a benzoselenazole ring, a naphthoselenazole ring, and a quinoline ring. A benzothiazole ring and a naphthothiazole ring are preferable. The respective heterocyclic rings may have an optional substituent, examples of which including a water-soluble group such as a sulfonic acid group, a hydroxyl group, an alkyl group having a sulfonic acid group, or an alkyl group having a hydroxyl group. These substituents may be present on rings $Ar_3$ to $Ar_6$ or may be bonded to a nitrogen atom in the heterocyclic ring. The methine chain number b is 1 to 7, preferably 3 to 5. Substituent R may be present on the methine chain, examples of the substituent including a phenyl group which may have a substituent. $Ar_7$ in General Formula 4 represents a cyclic backbone having 5 to 7 carbon atoms, examples of substituents W including a halogen; a phenylamino group which may have a substituent; a phenoxy group which may have a substituent; and a phenylthio group which may have a substituent. In this case, the substituent may have a water-soluble group. The dye is in the form of an inner or intermolecular salt. Examples of intermolecular salts include a halide salt; perchlorate; fluoroantimonate; fluorophosphate; fluoroborate; an organic salt such as trifluoromethanesulfonate, bis(trifluoromethane)sulfonate imide or naphthalene sulfonic acid; and the like. Specific examples of such salts include indocyanine green and water-soluble dyes as disclosed in JP S63-33477 A, e.g., Compound Examples 3 to 6.

(General Formula 3)

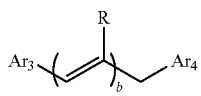

(General Formula 4)

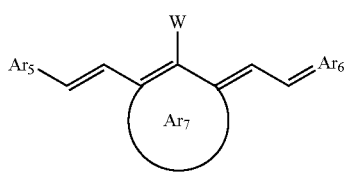

(Compound Example 3)

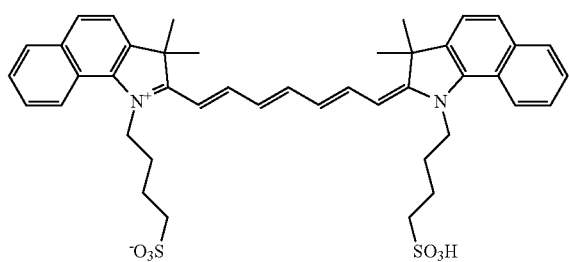

(Compound Example 4)

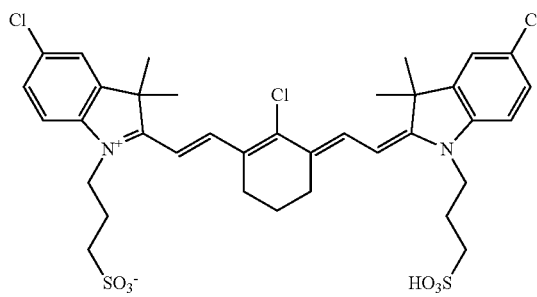

(Compound Example 5)

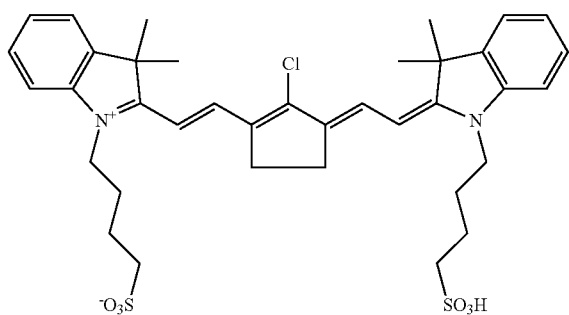

(Compounbd Example 6)

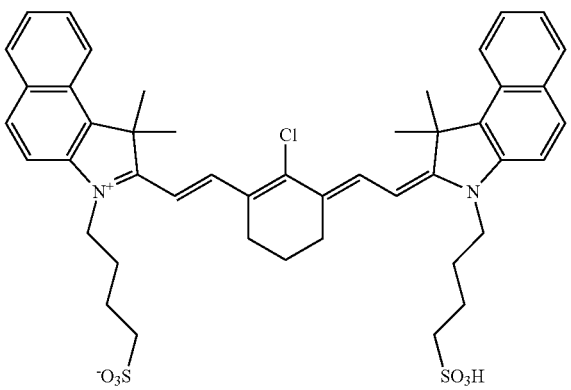

Squarylium dyes have a structure similar to that of cyanine dyes and have squaric acid in the main backbone. It is preferable that $Ar_8$ and $Ar_9$ in General Formula 5 have a heterocycle similar to that in cyanine types. These dyes are also in the form of an inner or intermolecular salt like cyanine types. The dyes initially have a hydrophobic structure, but as is the case with cyanine types, a water-soluble group may be added to make them soluble in water.

(General Formula 5)

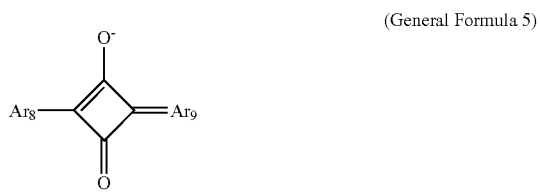

Azo dyes absorb light in a visible range and are mainly used for water-soluble inks. However, there also commercially available azo dyes which can absorb light in even near-infrared range because their absorption band has been widened. For example, C. I. Acid Black 2 (produced by Orient Chemical Industries Co., Ltd.) and C. I. Direct Black 19 (produced by Aldrich Chemical Co., Ltd.) are generally used in the production of black ink, as disclosed in Japanese Patent No. 5979728. Azo dyes may also form a complex with a metal, as illustrated in General Formula 6, wherein $M_2$ denotes the central metal, examples of which including cobalt and nickel; and Ai and Bi are, for example, aromatic rings such as benzene rings and naphthalene rings. More specifically, the structures of the dyes disclosed in JP S59-11385 A are preferable.

(General Formula 6)

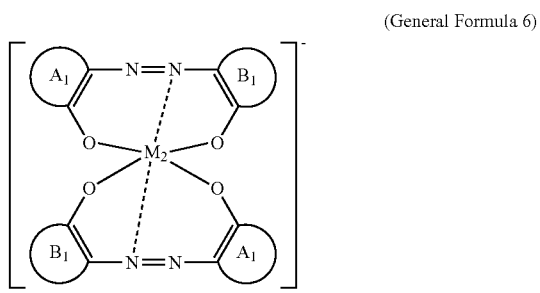

The metal complex dyes are represented by General Formula 7, General Formula 8, or the like, wherein $M_3$ and $M_4$ denote metals, typically Pd, Ni, Co and Cu, Ni being particularly preferable; $R_1$, $R_2$, $R_{1'}$, and $R_{2'}$ denote an optional substituent, specific examples thereof including a halogen atom, an alkyl group which may have a sulfo group, an alkoxy group which may have a sulfo group, a cyano group, an amino group, a nitro group, and a phenyl group which may have a substituent; and $X_1$ to $X_4$ each independently denote a nitrogen atom, an oxygen atom, or a sulfur atom.

When $X_1$ to $X_4$ are a nitrogen atom, the nitrogen atom may be a hydrogen adduct NH or a nitrogen atom substituted with, for example, an alkyl group having 1 to 4 carbon atoms or a phenyl group which may have a substituent.

(General Formula 7)

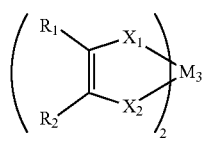

(General Formula 8)

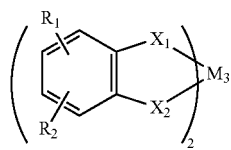

The boron complex system is represented by General Formula 9. The structure of the dyes disclosed in JP 2010-106248 A are preferable.

(General Formula 9)

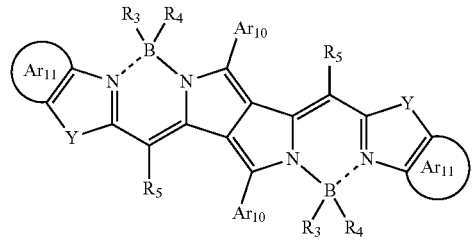

In General Formula 9, $R_3$ and $R_4$ are preferably a hydrogen atom, an alkyl group, or a phenyl group; $R_5$ is preferably a strongly electron attracting group, for example, a nitro group or a cyano group; $Ar_{10}$ is preferably a phenyl group which may have a substituent; $Ar_{11}$ is preferably an aromatic ring or a cyclic structure composed of a heterocyclic ring, the latter being more preferable for long-wavelength absorption; and Y is preferably a sulfur atom or an oxygen atom.

Diimonium dyes, which exhibit absorption at a relatively long wavelength side in the near infrared range (950 to 1,100 nm), are represented by General Formula 10.

(General Formula 10)

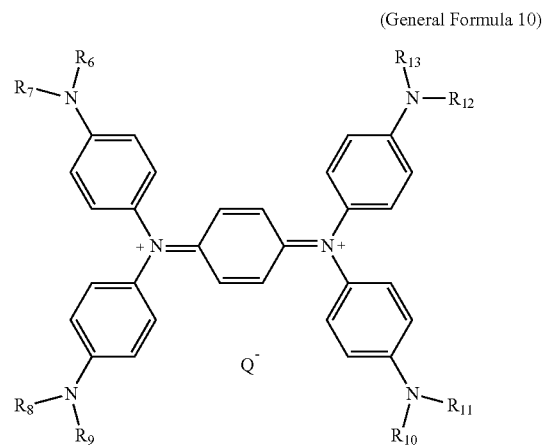

In General Formula 10, $R_6$ to $R_{13}$ are, for example, alkyl groups which may have a substituent, or aromatic rings which may have a substituent. Those dyes are usually hydrophobic, but ones to which a water-soluble group has been added are also disclosed in JP 2001-181184 A. The dyes may also take the form of an inner or intermolecular salt, examples of $Q^-$ in the latter including a halide ion, perchloric acid ion, antimony fluoride ion, phosphorus fluoride ion, boron fluoride ion, trifluoromethanesulfonate ion, bis(trifluoromethane)sulfonate imide ion, and naphthalene sulfonic acid ion.

Diphenylamines/triphenylamines are represented by General Formula 11 and General Formula 12.

(General Formula 11)

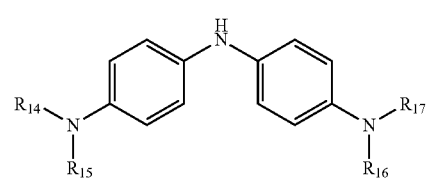

(General Formula 12)

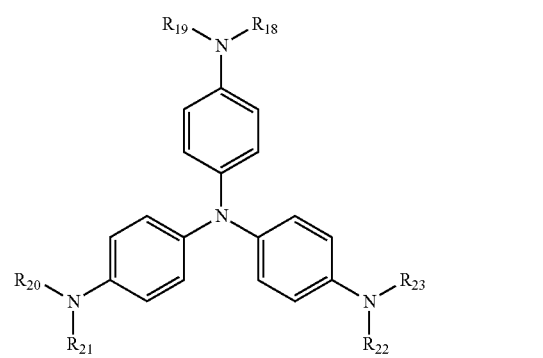

$R_{14}$ to $R_{17}$ in General Formula 11, and $R_{18}$ to $R_{23}$ in General Formula 12, are each independently a hydrogen atom or an alkyl group having at least one carbon atom. The alkyl group optionally has one or more heteroatoms selected from a nitrogen atom, an oxygen atom, a sulfur atom, and a halogen atom. The one or more nitrogen atoms are a cation radical, and the charge of the one or more cation radical are equilibrated by one or more anions.

In the present application, anthraquinones may be preferably used, these being represented by, for example, General Formula 13, wherein $R_{24}$ and $R_{25}$ are each independently a hydrogen atom, an alkyl group having 1 to 4 carbon atoms, a phenyl group which may have a substituent, or the like; $R_{26}$ denotes a linear or branched alkyl, cycloalkyl, alkenyl, aralkyl, aryloxyalkyl having 1 to 16 carbon atoms, all of which may be through 1 to 5 oxygen atoms, or an aryl which may have a substituent of an alkyl or alkoxy having 1 to 12 carbon atoms; and Z denotes a nitrogen atom, an oxygen atom, or a sulfur atom. Examples of dyes having a typical structure include ones disclosed in Patent Document 7. When Z is a nitrogen atom, it denotes a hydrogen adduct NH or a nitrogen atom substituted with, for example, an alkyl group having 1 to 4 carbon atoms or a phenyl group which may have a substituent.

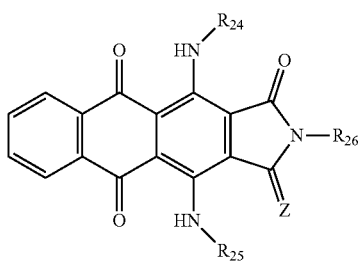

(General Formula 13)

The polarizing plate of the present invention can be produced as described above. A protective film can be applied to one or both of its sides by means of an adhesive or pressure-sensitive adhesive. By using such a protective film, the plate can be made physically stable while being left highly flexible. As a protective film, triacetyl cellulose, acrylic, polycarbonate, or cycloolefin, as used for protecting a conventional polarizing plate, may be applied, the film preferably being transparent and having so low birefringence that any phase difference produced is small. Since a film composed of a thermoplastic resin exhibits a high degree of hardness and low susceptibility to humidity, the film generally has good surface properties without a protective film such as TAC. A polymerizable resin composition may be directly applied to form a hard coat layer, an antiglare layer, a low-reflection layer, or the like. In the case of applying a protective film, a polarizing plate can be obtained by laminating the above protective film on at least one side or, normally, on both sides of a polarizing element via the above adhesive followed by drying the laminate. Drying conditions depend on the concentration of adhesive used and the moisture permeability of the protective film. It is preferable that drying be carried out at 25 to 100° C. for approximately 1 to 150 minutes.

The polarizing plate of the present invention may also be used as a substrate by bonding it to an inorganic substrate such as a prism or glass member or to a plastic plate or the like. A curved surface can also be formed by bonding the polarizing plate to the curved surface of a glass or plastic plate.

When the polarizing plate is bonded to a display device such as a liquid-crystal display device, various types of functional layers for improving viewing angles and/or contrast, or a layer or film which improves luminance, may be formed on the surface of the protective layer or film which is later not exposed. Those functional layers means, for example, layers or films that control phase difference. It is preferable that the polarizing plate be bonded to such a film or a display device by means of an adhesive.

The polarizing plate may incorporate various known types of functional layer such as an anti-reflection layer, an antiglare layer, and a hard coat layer on the exposed surface of the protective layer or film. While a coating method is preferably used to form these functional layers, such functional films may also be bonded by using an adhesive or pressure-sensitive adhesive.

The polarizing element or polarizing plate of the present invention, incorporating according to necessity a protective layer, a functional layer, or a transparent support such as a crystal or sapphire, may be applied to, for example, a liquid-crystal projector, a calculator, a clock, a laptop computer, a word processor, a liquid-crystal television, a polarizing lens, polarizing glasses, car navigation system, a sensor, a lens, a switching element, an isolator, a camera, an indoor or outdoor measuring instrument, and an in-car display. A device incorporating the present polarizing plate for infrared light is highly durable and reliable for an infrared wavelength range, and is capable of providing high contrast over a long lifetime.

EXAMPLES

Hereinafter the present invention will be described in more detail with reference to Examples, but the present invention is not limited thereto.

Example 1

A polyvinyl alcohol film (VF-PS, produced by Kuraray Co., Ltd.) having a saponification degree of 99% or greater and an average polymerization degree of 2400 was immersed in warm water at 40° C. for 3 minutes to cause it to swell treatment at a stretching ratio of 1.30 times. The swollen film was immersed in a dyeing solution containing 1,500 parts by mass of water, 1.5 parts by mass of sodium tripolyphosphate, 1.5 parts by mass of anhydrous sodium sulfate, and 1.5 parts by mass of S2180, produced by FEW CHEMICAL, which is represented by Formula (1), as a cyanine dye exhibiting absorption in an infrared range, at 45° C. for 8 minutes and 00 seconds to introduce the azo compound into the film. The obtained film was immersed in an aqueous solution containing 20 g/l boric acid (produced by Societa Chimica Larderello s.p.a.), at 40° C. for 1 minute. The film after the immersion was stretched to 5.0 times in an aqueous solution containing 30.0 g/l of boric acid at 50° C. for 5 minutes. The obtained film was washed by soaking it under the tension in water at 25° C. for 20 seconds. The film after the washing was dried at 70° C. for 9 minutes to obtain a polarizing plate. On this polarizing plate, a triacetyl cellulose film which had been treated with alkali (TD-80U, produced by Fujifilm Corporation) was laminated using an adhesive prepared by dissolving polyvinyl alcohol (NH-26, produced by Japan VAM & POVAL Co., Ltd.) in water at 4% to obtain a polarizing plate with a protective film. The resulting polarizing plate maintained the same optical properties—in particular, the single-plate transmittance, hue, polarization degree, and the like—as the polarizing plate without the protective film. This polarizing plate was used as a specimen in Example 1.

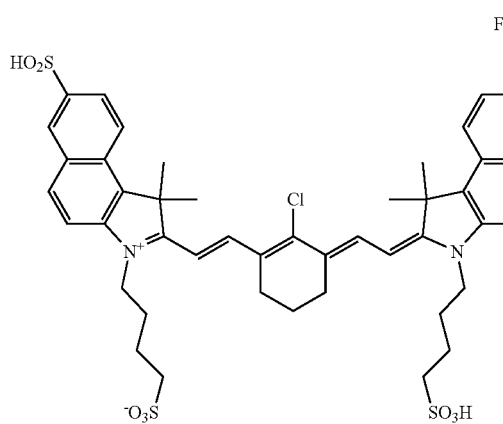

Formula (1)

Example 2

A polarizing plate was produced and used as a specimen in the same manner as in Example 1 except that the used dye exhibiting absorption in an infrared range was changed to a cyanine dye represented by Formula (2), S0378, produced by FEW CHEMICAL (1.5 parts by mass).

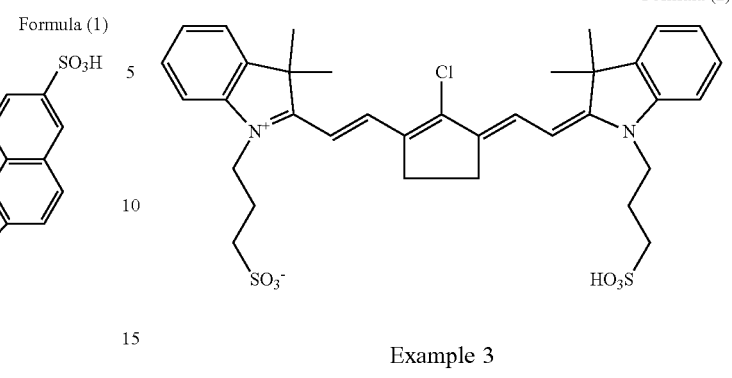

Formula (2)

Example 3

A polarizing plate was produced and used as a specimen in the same manner as in Example 1 except that the used dye exhibiting absorption in an infrared range was changed to an azo dye, C. I. Acid Black 2, produced by Orient Chemical Industries Co., Ltd. (1.5 parts by mass).

Example 4

A polarizing plate was produced used as a specimen in the same manner as in Example 1 except that the used dye exhibiting absorption in an infrared range was changed to an azo dye represented by Formula (3), C. I. Direct Black 19, produced by SHAOXING BIYING TEXTILE TECHNOLOGY Co., LTD. (1.5 parts by mass).

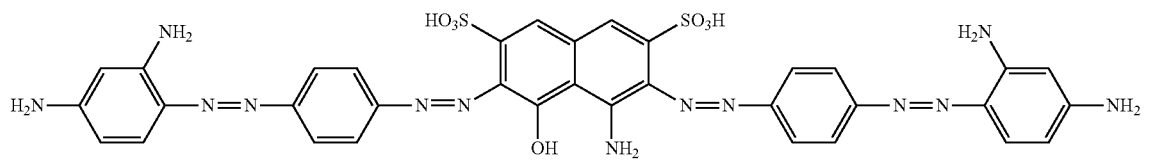

Formula (3)

Example 5

A composition was prepared by formulating 0.15 parts by mass of 50391, produced by FEW CHEMICAL, represented by Formula (4), as a cyanine dye exhibiting absorption in an infrared range in 100 parts by mass of Vylon UR8200, produced by Toyobo Co., Ltd.; thoroughly mixing them; then was cast on glass in a thickness of 250 μm. After casting, the solvent included in the Vylon UR8200 was dried to yield a film of 75 μm. The obtained film was stretched in an environment of 80° C. to three times its initial length to yield a polarizing plate.

Formula (4)

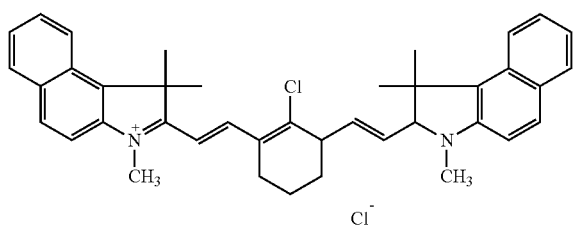

Example 6

A composition was prepared by formulating 0.15 parts by mass of 52437, produced by FEW CHEMICAL, represented by formula (5), as a cyanine dye exhibiting absorption in an infrared range in 100 parts by mass of Vylon UR1400, produced by Toyobo Co., Ltd.; and by thoroughly mixing them, then was cast on glass in a thickness of 250 μm. After casting, the solvent included in the Vylon UR1400 was dried to yield a film of 75 μm. The obtained film was stretched in an environment of 80° C. to three times its initial length to yield a polarizing plate.

Formula (5)

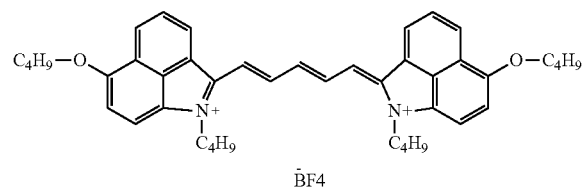

Example 7

A composition was prepared by formulating 0.2 parts by mass of Compound No. 19 of JP S59-26293 A, represented by Formula (6), as an anthraquinone dye exhibiting absorption in an infrared range in 100 parts by mass of Vylon UR1400, produced by Toyobo Co., Ltd.; thoroughly mixing them, then was cast on glass in a thickness of 250 μm. After casting, the solvent included in the Vylon UR1400 was dried to yield a film of 75 μm. The obtained film was stretched in an environment of 80° C. to three times its initial length to yield a polarizing plate.

Formula (6)

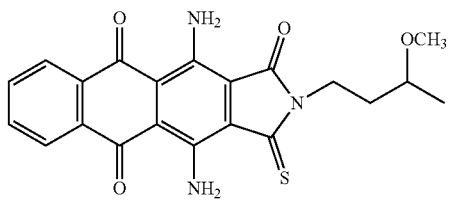

Comparative Example 1

A polarizing plate was produced and used as a specimen in the same manner as in Example 3 except that the black dye was changed to a similar black dye, Black S, produced by Nippon Kayaku Co., Ltd. (1.5 parts by mass).

Evaluation

The specimens obtained in Examples 1 to 7 and Comparative Example 1 were evaluated as follows:

(a) Polarization parallel transmittance Ky and polarization perpendicular transmittance Kz A polarization parallel transmittance Ky and polarization perpendicular transmittance Kz of each specimen were measured by means of a spectrophotometer (UH-4150, manufactured by Hitachi Ltd.). Here, polarization parallel transmittance Ky refers to the spectral transmittance in each wavelength when specimen was irradiated with light through a Glan-Taylor polarizer corresponding to the ultraviolet to infrared range on the condition that specimen and polarizer were stacked with their absorption axes of polarization parallel. Polarization perpendicular transmittance Kz refers to the spectral transmittance in each wavelength when specimen was irradiated with light through a Glan-Taylor polarizer corresponding to the ultraviolet to infrared range on the condition that specimen and polarizer were stacked with their absorption axes of polarization perpendicular.

(b) Contrast

The contrast of each specimen was calculated by substituting polarization parallel transmittance Ky and polarization perpendicular transmittance Kz in the following equation:

$$Contrast = Ky/Kz$$

Table 1 shows the highest contrast value calculated from Ky and Kz at each wavelength and the wavelength at which the highest contrast was achieved.

TABLE 1

|  | Contrast | Wavelength (nm) |
| --- | --- | --- |
| Example 1 | 54.3 | 833 |
| Example 2 | 30.8 | 788 |
| Example 3 | 30.1 | 710 |
| Example 4 | 131.1 | 720 |
| Example 5 | 21.1 | 845 |
| Example 6 | 43.2 | 942 |
| Example 7 | 221.0 | 778 |
| Comparative Example 1 | 30.0 | 603 |

As shown in Table 1, the specimens of Examples 1 to 7 exhibit the highest contrast at a wavelength in an infrared range (700 nm to 1,000 nm), and the contrast at such wavelengths is almost equal to or greater than that of the generic dye of Comparative Example 1. On the other hand, the specimen of Comparative Example 1 does not only exhibit the highest contrast at a wavelength of 603 nm, but also substantially exhibits no contrast at 700 nm. This demonstrates that it is important in the present invention to use a dye exhibiting absorption in an infrared range. While the contrast of normal black and white display—for example, that in a newspaper—is approximately 10, the polarizing plates of the present invention exhibit the equal to or greater than that of generic dichroic dyes, producing the highest contrast at a wavelength in an infrared range (700 nm to 1,000 nm). This indicates that the polarizing plate of the present invention sufficiently functions as a polarizing plate for an infrared range.

Durability Test

The specimens of Examples 1 to 7 were subjected to a heat-resistance test at 90° C. and placed in an environment of 65° C. and a relative humidity of 95% RH for 240 hours. As a result, no changes were found in the contrast or wavelength in the specimens of Examples 1 to 7. This demonstrated that the polarizing plates of Examples 1 to 7 are highly reliable and that devices and lenses using them can achieve highly reliable contrast in an infrared range.

The invention claimed is:

1. A polarizing plate which is a stretched film comprising a dye exhibiting absorption in an infrared range and which is dichroic in an infrared range, wherein the polarizing plate has a dichroic ratio of five or more, wherein the dye is selected from the group consisting of an azo compound selected from the group consisting of C.I. Acid Black 2 and a complex formed therefrom with a metal, an anthraquinone compound represented by the General Formula 13:

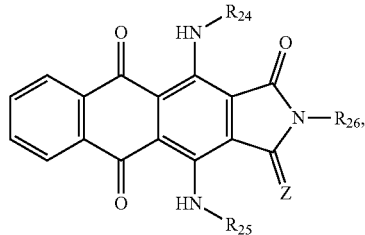

(General Formula 13)

and a cyanine compound represented by the General Formula 3 or 4:

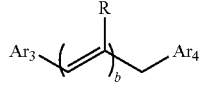

(General Formula 3)

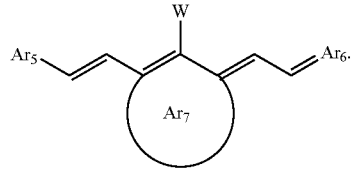

(General Formula 4)

2. The polarizing plate according to claim 1, wherein the dye exhibits a maximum absorption at a wavelength of 700 to 1,500 nm.

3. The polarizing plate according to claim 1, wherein the dye is a water-soluble dye.

4. The polarizing plate according to claim 1, wherein the film comprises a hydrophilic polymer as a base material.

5. The polarizing plate according to claim 4, wherein the hydrophilic polymer is a polyvinyl alcohol resin.

6. The polarizing plate according to claim 1, further comprising a transparent protective layer on one or both sides.

7. A liquid-crystal display device, a sensor, a lens, a switching device, an isolator, or a camera, comprising the polarizing plate according to claim 1.

8. A method of using a dye exhibiting absorption in an infrared range for a polarizing plate, the method comprising incorporating the dye in a film and stretching the film to develop dichroic properties such that the polarizing plate has a dichroic ratio of five or more, wherein the dye is selected from the group consisting of an azo compound selected from the group consisting of C.I. Acid Black 2 and a complex formed therefrom with a metal, an anthraquinone compound represented by the General Formula 13:

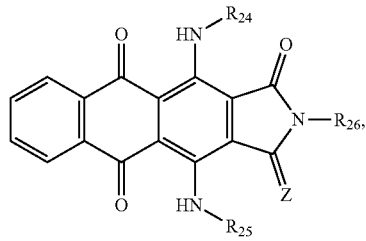

(General Formula 13)

and a cyanine compound represented by the General Formula 3 or 4:

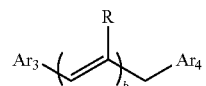

(General Formula 3)

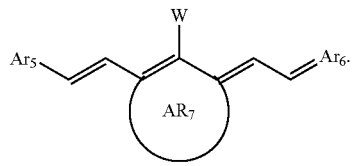

(General Formula 4)

9. The method according to claim 8, wherein the dye exhibits a maximum absorption at a wavelength of 700 to 1,500 nm.

10. The method according to claim 8, wherein the dye is a water-soluble dye.

11. The method according to claim 8, wherein the polarizing plate is for a liquid-crystal display device, a sensor, a lens, a switching device, an isolator, or a camera.

* * * * *